(12) United States Patent
Zhang et al.

(10) Patent No.: US 8,995,771 B2
(45) Date of Patent: Mar. 31, 2015

(54) IDENTIFICATION OF DUPLICATES WITHIN AN IMAGE SPACE

(75) Inventors: Lei Zhang, Beijing (CN); Xin-Jing Wang, Beijing (CN); Wei-Ying Ma, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 13/459,777

(22) Filed: Apr. 30, 2012

(65) Prior Publication Data

US 2013/0287302 A1    Oct. 31, 2013

(51) Int. Cl.
| | |
|---|---|
| G06K 9/46 | (2006.01) |
| G06K 9/66 | (2006.01) |
| G06K 9/62 | (2006.01) |
| G06K 9/54 | (2006.01) |
| G06K 9/60 | (2006.01) |
| G06F 7/00 | (2006.01) |
| G06F 17/30 | (2006.01) |

(52) U.S. Cl.
CPC .................................... *G06K 9/6218* (2013.01)
USPC ........... 382/190; 382/195; 382/225; 382/305; 707/737

(58) Field of Classification Search
None
See application file for complete search history.

(56) References Cited

U.S. PATENT DOCUMENTS

| | | | |
|---|---|---|---|
| 6,781,711 B1 | 8/2004 | Rijavec et al. | |
| 7,366,718 B1 | 4/2008 | Pugh et al. | |
| 7,421,128 B2 | 9/2008 | Venkatesan et al. | |
| 7,519,200 B2 | 4/2009 | Gokturk et al. | |
| 7,549,052 B2 | 6/2009 | Haitsma et al. | |
| 7,551,780 B2 | 6/2009 | Nudd et al. | |
| 7,639,387 B2 | 12/2009 | Hull et al. | |
| 7,647,331 B2 | 1/2010 | Li et al. | |
| 7,801,893 B2 * | 9/2010 | Gulli' et al. | 707/737 |
| 7,860,308 B2 | 12/2010 | Shah | |
| 8,055,078 B2 | 11/2011 | Choi et al. | |
| 8,094,872 B1 | 1/2012 | Yagnik et al. | |
| 8,111,912 B2 * | 2/2012 | Husseini et al. | 382/162 |
| 8,126,274 B2 | 2/2012 | Li et al. | |
| 8,184,953 B1 | 5/2012 | Covell et al. | |
| 8,229,219 B1 | 7/2012 | Ioffe | |
| 8,295,617 B2 | 10/2012 | Collins | |
| 8,352,465 B1 * | 1/2013 | Jing et al. | 707/723 |
| 8,438,163 B1 * | 5/2013 | Li et al. | 707/737 |
| 8,611,649 B2 * | 12/2013 | Jia | 382/165 |
| 8,873,839 B2 * | 10/2014 | Umeda | 382/159 |

(Continued)

OTHER PUBLICATIONS

A. Broder. On the resemblance and containment of documents, Jun. 1998. In SEQS: Sequences '91. 2, 9 pages.

(Continued)

*Primary Examiner* — Matthew Bella
*Assistant Examiner* — Jose M Torres
(74) *Attorney, Agent, or Firm* — Dan Choi; Judy Yee; Micky Minhas

(57) ABSTRACT

Implementations for identifying duplicate images in an image space are described. An image space is partitioned into a plurality of coarse clusters based on signatures of the images within the image space. The signatures are determined from compact descriptors of the images. Refined clusters that include one or more images of an individual coarse cluster are created based on pair-wise comparisons of the compact descriptors of images in the coarse cluster, and the refined clusters are identified as sets of duplicate images. The refined clusters are grown by searching in similar coarse clusters for images to add to the refined clusters.

20 Claims, 4 Drawing Sheets

(56) References Cited

U.S. PATENT DOCUMENTS

| | | | |
|---|---|---|---|
| 2007/0041657 A1 | 2/2007 | Rychagov et al. | |
| 2007/0127813 A1 | 6/2007 | Shah | |
| 2008/0118151 A1* | 5/2008 | Bouguet et al. | 382/181 |
| 2009/0060351 A1 | 3/2009 | Li et al. | |
| 2009/0132571 A1 | 5/2009 | Manasse et al. | |
| 2009/0220166 A1 | 9/2009 | Choi et al. | |
| 2010/0266215 A1 | 10/2010 | Hua et al. | |
| 2011/0085728 A1 | 4/2011 | Gao et al. | |
| 2011/0087668 A1 | 4/2011 | Thomas et al. | |
| 2011/0305399 A1* | 12/2011 | Zitnick et al. | 382/225 |
| 2012/0099796 A1 | 4/2012 | Zitnick, III | |

OTHER PUBLICATIONS

Yang et al., "MyFinder: Near-duplicate Detection for Large Image Collections," MM'09, Oct. 19-24, 2009, Beijing, China, 2 pages.

Chum et al., "Geometric Min-Hashing: Finding a (Thick) Needle in a Haystack," available from http://cmp.felk.cvut.cz/~chum/papers/chum09cvpr.pdf, Computer Vision and Pattern Recognition, 2009. CVPR 2009, Jun. 20-25, 2009, 8 pages.

Chum et al., "Near Duplicate Image Detection: Min-Hash and tf-idf Weighting," Proceedings of the British Machine Vision Conference, Sep. 2008, 10 pages.

Chum et al., "Scalable Near Identical Image and Shot Detection," Proceedings of the 6th ACM international conference on Image and video retrieval, Jul. 2007, 8 pages.

Chum et al, "Large Scale Discovery of Spatially Related Images," Pattern Analysis and Machine Intelligence (PAMI), Feb. 2010, pp. 1-8.

Dean et al., "MapReduce: Simplified Data Processing on Large Clusters," Communications of the ACM, Jan. 2008, 13 pages.

Fischler et al., "Random Sample Consensus: A Paradigm for Model Fitting with Applications to Image Analysis and Automated Cartography," Graphics and Image Processing, Jun. 1981, 15 pages.

Fisichella et al., "Efficient Incremental Near Duplicate Detection based on Locality Sensitive Hashing," DEXA'10 Proceedings of the 21st international conference on Database and expert systems applications, Sep. 2010, 14 pages.

Foo, et al., "Clustering Near-Duplicate Images in Large Collections", In Proceedings of International Workshop on Workshop on Multimedia Information Retrieval, Sep. 28-29, 2007, 10 pages.

Ghosh, et al., "Duplicate Image Detection in Large Scale Databases", In Proceedings of Book Chapter in Platinum Jubilee Volume, Oct. 24, 2007, pp. 1-17.

Google goggles, Dec. 12, 2011, obtained from http://www.google.com/mobile/goggles/, 1 page.

Hsieh, et al., "A Duplicate Image Detection Scheme using Hash Functions for Database Retrieval", In Proceedings of International Conference on Systems Man and Cybernetics, IEEE, Oct. 10-13, 2010, pp. 3487-3492.

Indyk et al., "Approximate Nearest Neighbors: Towards Removing the Curse of Dimensionality," STOC '98 Proceedings of the thirtieth annual ACM symposium on Theory of computing, May 1998, 35 pages.

Jain et al., "Fast Image Search for Learned Metrics," Computer Vision and Pattern Recognition, Jun. 2008, 8 pages.

Jegou et al., "Hamming Embedding and Weak Geometric Consistency for Large Scale Image Search," Proceedings of the 10th European Conference on Computer Vision: Part I, Oct. 2008, 15 pages.

Ke et al., "Efficient Near-Duplicate Detection and Sub-Image Retrieval," IEEE International Conference on Multimedia and Expo, Apr.-Jun. 2008, 8 pages.

Lamdan et al., "Geometric Hashing: A General and Efficient Model-Based Recognition Scheme," Second International Conference on Computer Vision, Dec. 1988, 12 pages.

Lee et al., "Partition min-Hash for Partial Duplicate Image Discovery," ECCV'10 Proceedings of the 11th European conference on Computer vision, Oct. 2008, 14 pages.

Li et al., "Modeling and Recognition of Landmark Image Collections Using Iconic Scene Graphs," ECCV '08 Proceedings of the 10th European Conference, Oct. 2008, 14 pages.

Lowe, "Distinctive Image Features from Scale-invariant Keypoints," International Journal of Computer Vision, Nov. 2004, 28 pages.

Mikolajczyk et al., "A Performance Evaluation of Local Descriptors," Pattern Analysis and Machine Intelligence, Oct. 2005, 34 pages.

Min et al., "Compact Projection: Simple and Efficient near Neighbor Search with Practical Memory Requirements," Computer Vision and Pattern Recognition (CVPR), Jun. 2010, 8 pages.

Nister et al., "Scalable Recognition with a Vocabulary Tree," In IEEE Conference on Computer Vision and Pattern Recognition (CVPR), Jun. 2006, 8 pages.

O. Chum and J. Matas, Large scale discovery of spatilly related images. IEEE T-PAMI, vol. 32, No. 2, Feb. 2010, 7 pages.

O. Chum and J. Matas, Geometric hashing with local affine frames, CVPR'2006, Jun. 2006, 6 pages.

Oliva et al., "Modeling the Shape of the Scene: A Holistic Representation of the Spatial Envelope," International Journal of Computer Vision, Jan. 22, 2001, 31 pages.

Philbin et al., "Object Retrieval with Large Vocabularies and Fast Spatial Matching," Computer Vision and Pattern Recognition, Jun. 2007, 8 pages.

Shakhnarovich et al., "Nearest-Neighbor Methods in Learning and Vision: Theory and Practice," Neural Information Processing series, Mar. 24, 2006, 26 pages.

Sivic et al., "Video Google: A Text Retrieval Approach to Object Matching in Videos," Computer Vision, 2003. Proceedings. Ninth IEEE International Conference, Oct. 2003, 8 pages.

Tan et al., "Scalable Detection of Partial Near-Duplicate Videos by Visual-Temporal Consistency," MM'09, Oct. 19-24, 2009, Beijing, China, 10 pages.

Torralba et al., "Small Codes and Large Image Databases for Recognition," Computer Vision and Pattern Recognition, Jun. 2008, 8 pages.

Wu et al., "Scalable Face Image Retrieval with Identity-Based Quantization and Multi-Reference Re-ranking," Computer Vision and Pattern Recognition (CVPR), 2010 IEEE Conference, Jun. 2010, 8 pages.

Wang et al., "ARISTA—Image Search to Annotation on Billions of Web Photos," Multimedia and Expo, 2006 IEEE International Conference, Jul. 2006, 8 pages.

Wang et al., "Large-Scale Duplicate Detection for Web Image Search," Multimedia and Expo, 2006 IEEE International Conference, Jul. 2006, 4 pages.

* cited by examiner

IDENTIFICATION OF DUPLICATES WITHIN AN IMAGE SPACE

BACKGROUND

Discovering duplicate images within an image space can be beneficial. For example, identifying duplicate images can provide better object recognitions results. It can also prevent duplicate images from being presented in an image search results page. Duplicate image discovery techniques fall into two categories: full duplicate discovery and partial duplicate discovery. Conventional partial duplicate discovery—or the discovery of images that may not be full duplicates but that have the same objects within them—utilizes local descriptors of the images and adopts various hashing techniques. Such techniques have been scaled to discover duplicates within an image space containing millions of images.

The problem of full duplicate discovery—or the discovery of images that are full duplicates (albeit with slight variations in scale and/or content)—can be tackled with global feature-based methods. Duplicate image discovery is different from, and more challenging than, duplicate image retrieval. Conventional duplicate image retrieval methods are not scalable, since the computational costs are quadratic to the number of images in the image space.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Global features are extracted from images within an image space, such as an internet-scale image space with billions of images. The global features are compressed into compact descriptors using Principal Component Analysis, and the compact descriptors are quantized into binary signatures. The signatures are used to partition the image space into coarse clusters, and the compact descriptors are used to create refined clusters within the coarse clusters.

Refined cluster growth is performed by searching in similar coarse clusters for images that match pseudo queries associated with the refined clusters. The pseudo queries are generated by averaging the compact descriptors of the images within the refined clusters, and similar clusters are identified based on Hamming distances of their signatures from signatures of the refined clusters. The refined clusters are identified and output as sets of duplicate images.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
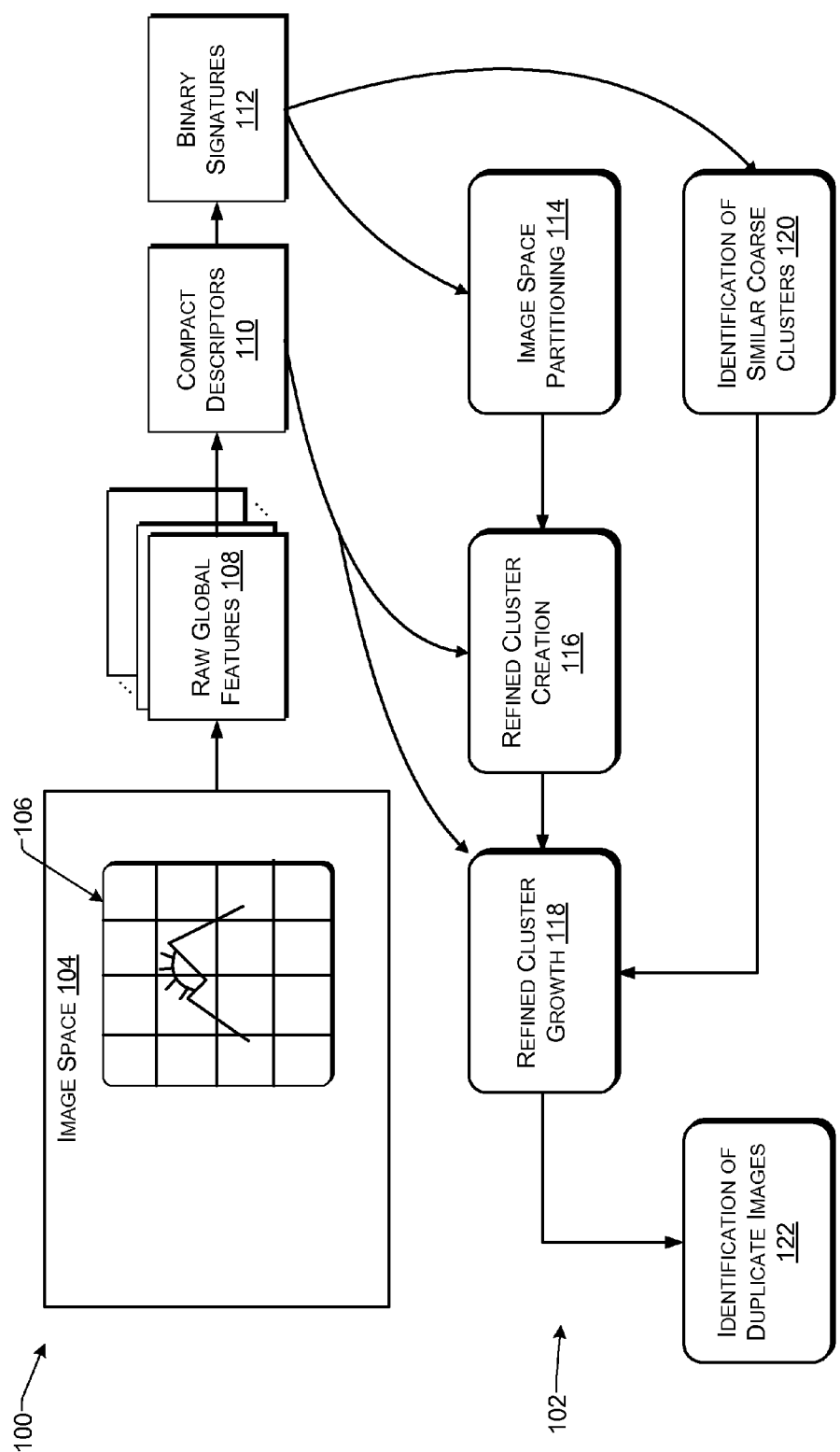
FIG. 1 is a block diagram of an example environment for identifying duplicate images according to embodiments.

As discussed above, conventional duplicate image discovery methods successfully scale to millions of images. But such discovery methods do not scale to larger image spaces, such as the public internet which contains billions of images. Embodiments of the present disclosure include methods for full duplicate image discovery that scale to image spaces that contain billions of images.

Embodiments utilize global feature extraction from images within the image space. Global features include, for example, gray block features, edge directional histograms, and non-edge-pixel ratios (i.e. the ratio of pixels of detected edges to those of non-edges). Raw global image features are compressed, such as for example by using Principal Component Analysis (PCA), to form compact descriptors of the images. The compact descriptors are quantized to form binary signatures for the images.

The image space is partitioned into coarse clusters based on the image signatures. In embodiments, images with identical signatures are grouped together to form coarse clusters. Because such coarse clusters may not have sufficient precision for internet-scale image spaces, additional processing is performed to identify refined clusters of images.

Image clustering to identify refined clusters is performed based on a $\epsilon$-clustering algorithm. The E-clustering algorithm includes pair-wise comparisons of the compact descriptors of the images within the coarse clusters. Images within a coarse cluster that have compact descriptors within a certain predefined distance from one another are grouped together to form refined clusters. Because there may also be images in other coarse clusters that are duplicates of the images within a particular refined cluster, a pseudo query is used to search images within similar coarse clusters. Images in the similar coarse clusters that are within a certain distance of the pseudo query are added to the refined clusters. The pseudo queries are, in embodiments, an average of the compact descriptors of the images in the refined clusters. A similar coarse cluster is defined based on its Hamming distance from the coarse cluster in question. The refined clusters are output as sets of duplicate images.

As used herein, the term "duplicate images" includes images that share the same objects, but that may vary slightly in scale, content, or other. That is, as used herein, one image may be deemed a duplicate of another image if the images have a calculated similarity that is greater than a predefined threshold. Thus, embodiments may find "true" duplicates (those that are identical in all respects), as well as images that are substantially similar (i.e., those that differ slightly in scale and/or content). Also, as used herein, the terms "clustering," "partitioning," "grouping," and so forth may be used interchangeably to describe the process of coarse cluster identification and/or refined cluster growth and expansion. These terms are not meant to imply the sorts of data structures that are used to describe images that are in a coarse or refined cluster. A database of image signatures and compact descriptors may be processed, according to embodiments, in order to designate duplicate images as belonging to the same coarse and/or refined clusters. Embodiments may identify images as belonging to the same coarse and/or refined cluster without storing them in a contiguous memory space, although embodiments may do so without departing from the scope of the present disclosure.

The processes, systems, and devices described herein may be implemented in a number of ways. Example implementations are provided below with reference to the following figures.

Example Environment

FIG. 1 is a block diagram of an example environment for identifying duplicate images according to embodiments. Image data 100 is utilized by process 102 to identify duplicate images in image space 104. Image space 104 includes a plurality of images, and may include billions of images, such as is present in an internet-scale image space. An example image, image 106, is evenly partitioned into blocks, from which raw global features 108 are extracted. The raw global features include mean gray values that are calculated for each block of the image 106. Additionally, edge directional histograms plus one dimension of non-edge-pixel ratio are extracted from blocks of the images in the image space 104. The edge directional histograms and the non-edge-pixel ratios are useful since gray block features are not sufficient to describe images in which a single color dominates.

In one example, the image 106 may be partitioned into 8×8 blocks and gray block features extracted from each block, resulting in a 64-dim (dimension) gray block feature for the image 106. The image 106 may be separately partitioned into 2×2 blocks and a 52-dim feature extracted from it which includes four twelve-edge directional histograms plus four non-edge ratios (one for each block). In this example, a 116-dim global feature is thus extracted from the image 106. Global features having more or fewer dimensions may be extracted from the images in the image space 104 without departing from the scope of embodiments. Also, embodiments may utilize different global features, such as in order to improve precision.

The raw global features 108 are compressed into compact descriptors 110. In embodiments, Principal Component Analysis (PCA) is utilized to compress the raw global features 108 into the compact descriptors 110. Additionally, compact descriptors 110 are quantized into binary signatures 112.

A PCA transfer matrix can be learned by conducting PCA on a sufficiently large number of images, for example millions of images. By omitting the least significant dimensions, PCA enables small noise and potential value drifting of features to be reduced.

Image space partitioning 114 utilizes the binary signatures of the images in the image space 104 to form coarse clusters. Images that have identical binary signatures are placed into the same coarse cluster. Different numbers of coarse clusters will be generated depending on the length of binary signatures 112.

Identification of duplicate images based only on coarse clustering is likely insufficient for internet-scale image spaces. It was found, for example, that average precision of coarse clustering was 86.5% using 40-bit signatures evaluated on a random selection of 1000 coarse clusters. Thus, refined cluster creation 116 utilizes the compact descriptors 110 to form refined clusters within the coarse clusters. An $\epsilon$-clustering algorithm is utilized to create the refined clusters. An example of the $\epsilon$-clustering algorithm is given by the following pseudo-code.

The $\epsilon$-clustering Algorithm:

Terms:
N: coarse cluster size
$\{x_i \mid 1 \leq i \leq N\}$: images in a coarse cluster The $\epsilon$-clustering Algorithm:

$C_i$: the i-th refined cluster, $1 \leq i \leq N$
$\delta_i \in \{1, ..., N\}$: cluster membership of $x_i$, $x_i \in C_{\delta_i}$
$\epsilon$: distance threshold
Initialization:
Ci = {xi}, $1 \leq i \leq N$
$\delta_i = -1$, $1 \leq i \leq N$
Clustering:
for all i = 1 : N do
    for all j = i + 1 : N do
        if Dist($x_i$, $x_j$) $\leq \epsilon$ then
            if $\delta_i = -1$ && $\delta_j = -1$ then
                $\delta_i = i$
                $C_i = C_i \cup \{x_j\}$ //$\epsilon$-ball creation
            end if
            if $\delta_i > 0$ && $\delta_j = -1$ then
                $\delta_j = \delta_i$
                $C_{\delta_i} = C_{\delta_i} \cup \{x_j\}$//$\epsilon$-ball expansion
            end if
            if $\delta_i > 0$ && $\delta_j > 0$ then
                $\delta_j = \delta_i$
                $C_{\delta_i} = C_{\delta_i} \cup C_{\delta_j}$ //$\epsilon$-ball merge
                $C_{\delta_j} = \emptyset$
            end if
        end if
    end for
end for
return $\{C_i \mid\mid C_i \mid \geq 2, 1 \leq i \leq N\}$ The $\epsilon$-clustering algorithm performs pair-wise comparisons between two images in a coarse cluster. Each image is initialized as a refined cluster, and a flag is used to indicate its cluster membership. During the pair-wise comparisons, if image $x_j$ passes the neighborhood check of image $x_i$ (e.g., is within the distance threshold $\epsilon$ from $x_j$), $x_j$ is assigned to the refined cluster that $x_i$ belongs to. This is the process of $\epsilon$-ball expansion. $\epsilon$-ball expansion identifies isolated duplicate images within a coarse cluster. Moreover, if $x_j$ is from a cluster (i.e., $C_{\delta_j}$), that cluster is merged into the cluster that $x_i$ belongs to (i.e., $C_{\delta_i}$). This is the process of $\epsilon$-ball merge, and it connects two duplicate clusters.

The $\epsilon$-clustering algorithm is able to form small refined clusters, and is therefore better able than other techniques such as k-means clustering to identify clusters that form a skewed space (such as a horseshoe shape). k-means clustering is sensitive to initial seeds and may fail on a skewed image distribution. Also, the computational cost of k-means clustering may be too high to be practical for internet-scale image spaces.

Partitioning the image space into coarse clusters may result in some duplicate images being scattered across multiple coarse clusters. Thus, refined cluster growth 118 utilizes the compact descriptors to search in similar coarse clusters for images to add to the refined clusters. A pseudo-query is constructed for each refined cluster, using the average of the compact descriptors of the images in each refined cluster. The pseudo query is then vector quantized to a pseudo query signature; the length of a pseudo query signature is not necessarily the same as the dimension of a pseudo query. Since the images in a refined cluster have low variance in their features, the pseudo query is representative of the refined cluster as a whole. Once the similar coarse clusters are identified (see discussion below), images within the similar coarse clusters are scored by its $L_2$ distance to the pseudo query and then ranked. The top-ranked images whose scores are less than a certain threshold are added to the refined cluster.

Identification of similar coarse clusters 120 utilizes the binary signatures 112 of the coarse clusters and the pseudo query signatures identified at 118. A Hamming distance (Dist$_h$) between the signature of the coarse clusters and the pseudo query signature is used to determine the similar coarse clusters to search in. In one example, Dist$_h \leq 2$, and the number of similar signatures is $$\binom{0}{H} + \binom{1}{H} + \binom{2}{H},$$

where H is the signature length and $$\binom{n}{m}$$

stands for the Combination operation which counts the number of images having n out of m different bits to the signature of a query. With 16-bit signatures, images from up to 137 coarse clusters will be searched for cluster growing for a given pseudo query.

Identification of duplicate images 122 identifies or outputs the refined clusters as sets of duplicate images.

Example Computing Device for Identifying Duplicate Images

Figure 2:
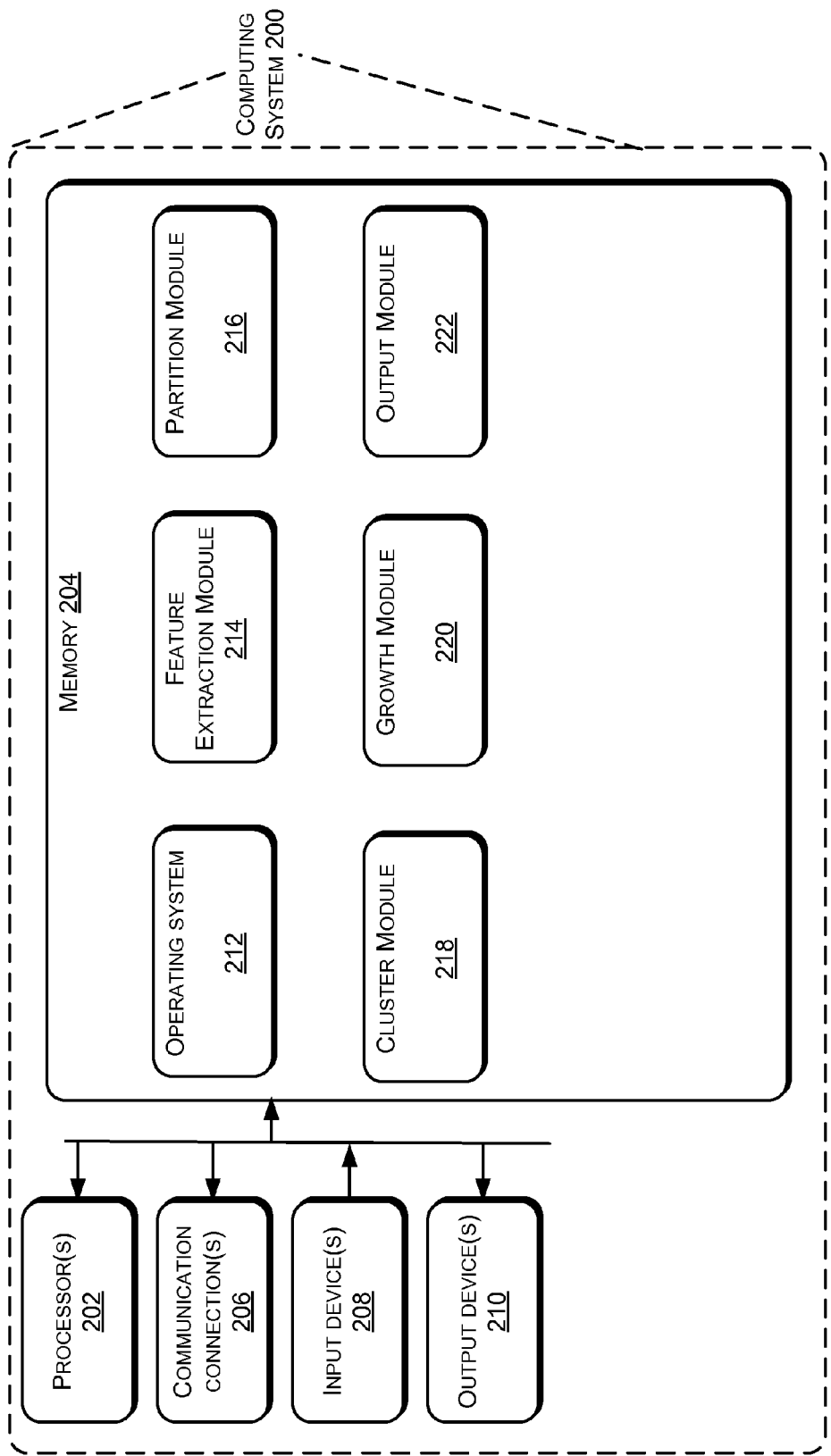
FIG. 2 is a block diagram of an example computing system usable to identify duplicate images.

FIG. 2 is a block diagram of an example computing system 200 usable to identify duplicate images. The computing system 200 may be configured as any suitable computing device capable of implementing all or part of a duplicate image discovery service. According to various non-limiting examples, suitable computing devices may include personal computers (PCs), servers, server farms, datacenters, special purpose computers, tablet computers, game consoles, smartphones, combinations of these, or any other computing device(s) capable of storing and executing all or part of a duplicate image discovery service.

In one example configuration, the computing system 200 comprises one or more processors 202 and memory 204. The computing system 200 may also contain communication connection(s) 206 that allow communications with various other systems. The computing system 200 may also include one or more input devices 208, such as a keyboard, mouse, pen, voice input device, touch input device, etc., and one or more output devices 210, such as a display, speakers, printer, etc. coupled communicatively to the processor(s) 202 and memory 204.

Memory 204 may store program instructions that are loadable and executable on the processor(s) 202, as well as data generated during execution of, and/or usable in conjunction with, these programs. In the illustrated example, memory 204 stores an operating system 212, which provides basic system functionality of the computing system 200 and, among other things, provides for operation of the other programs and modules of the computing system 200.

Memory 204 includes a feature extraction module 214 configured to extract raw global features, such as raw global features 108, from images of an image space. The feature extraction module 214 is configured to compress the raw global features into compact descriptors, such as compact descriptors 110. The feature extraction module may utilize Principal Component Analysis (PCA), along with a PCA transfer matrix, to create the compact descriptors. The feature extraction module 214 is configured to quantize the compact descriptors into binary signatures, such as binary signatures 112. The compact descriptors may be quantized using mean values of dimensions of the compact descriptors to generate the signatures.

A partition module 216 partitions the image space into a plurality of coarse clusters based on the binary signatures of the images within the image space. The coarse clusters are created, in embodiments, by grouping all images in the image space with the same binary signatures into the same coarse cluster. In other words, the partition module creates individual ones of the plurality of coarse clusters such that they include no images with non-identical signatures. Images with different signatures are placed into different coarse clusters.

A cluster module 218 is executable to create refined clusters within the plurality of coarse clusters using the ϵ-clustering algorithm, as described elsewhere within this Detailed Description. In particular, the cluster module 218 is configured to initialize images within a coarse cluster as refined clusters, and merge and grow the clusters based on pair-wise comparisons of the compact descriptors of the images within the same coarse clusters. Images within the coarse cluster are added to a refined cluster if its compact descriptor is within a certain distance threshold of an image within the refined cluster.

A growth module 220 searches similar coarse clusters for images to add to the refined clusters based on average compact descriptors of the refined cluster, as described elsewhere within this Detailed Description. In particular, the growth module 220 is configured to identify the similar coarse clusters based on Hamming distances between the coarse clusters and the refined clusters. The growth module 220 is configured to determine average compact descriptors of the refined clusters and to search the similar clusters for images to add to the refined clusters by determining whether compact descriptors of the images are within a threshold distance of the average compact descriptors of the refined clusters. Those that are within the threshold distance are added to the refined clusters.

An output module 222 is configured to output the refined clusters as sets of identical clusters. The output module 222 may identify the refined clusters as sets of duplicate images, and/or transmit data identifying the images in the refined clusters as being duplicates.

Example Operations for Identifying Duplicate Images

Figure 3:
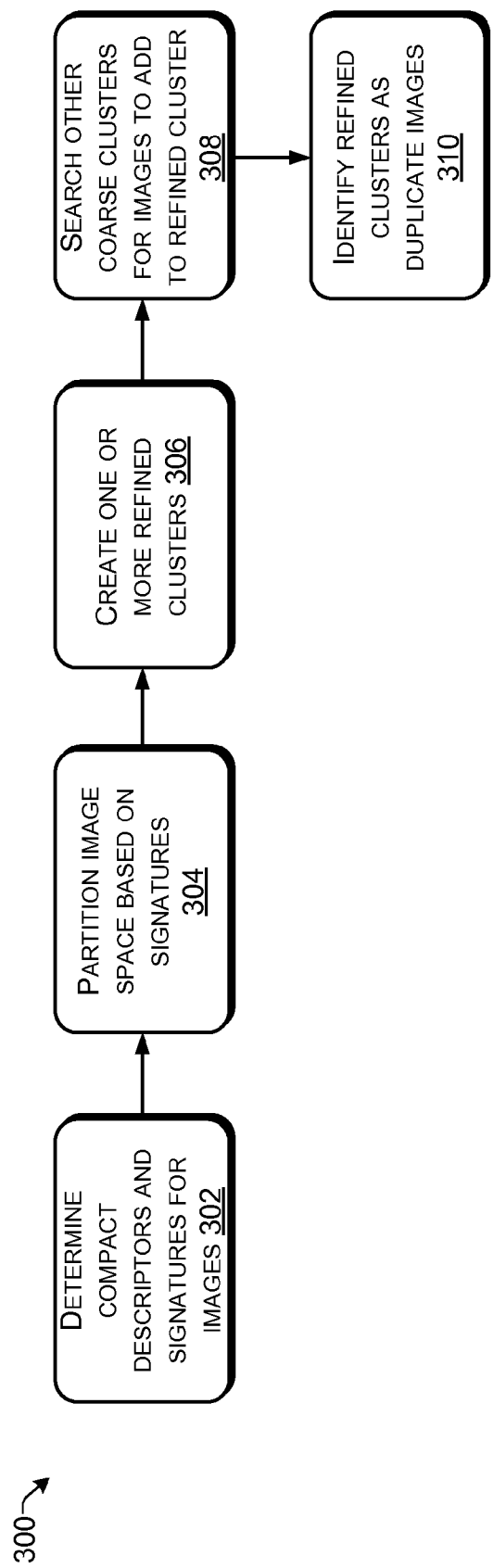
FIG. 3 is a flow diagram showing a process for identifying duplicate images in an image space.

FIG. 3 is a flow diagram showing a process 300 for identifying duplicate images in an image space. At 302, a feature extraction module, such as the feature extraction module 214, determines compact descriptors and signatures for images within an image space. This includes extracting raw global features from a plurality of images of an image space, the raw global features including gray block features, edge directional histograms, and non-edge-pixel ratios. Principal Component Analysis is used in embodiments to compress the raw global features of the plurality of images into compact descriptors. The compact descriptors are quantized using mean values of the dimensions of the compact descriptors to generate the signatures.

At 304, a partition module, such as the partition module 216, partitions a plurality of images of an image space into a plurality of coarse clusters based on signatures of the plurality of images determined from compact descriptors of the plurality of images. The images are partitioned, in embodiments, such that images having identical signatures are placed into the same coarse cluster. The coarse clusters may have, in embodiments, only images with identical signatures, and no images with non-identical signatures.

At 306, a cluster module, such as the cluster module 218, creates one or more refined clusters within the coarse clusters. The refined clusters include one or more images of an individual coarse cluster, and are formed based on pair-wise comparisons of the compact descriptors of the particular coarse cluster. An ϵ-clustering algorithm is used as is described in more detail elsewhere within this Detailed Description At 308, a growth module, such as the growth module 220, searches other coarse clusters for images to add to the refined clusters. The searches are based on pseudo queries which, in embodiments, are average compact descriptors of the one or more images of the refined clusters. Not all coarse clusters are searched. Instead, similar clusters may be searched, determined for example by Hamming distances between signatures of the coarse clusters and quantized binary signatures derived from the average compact descriptors of the refined clusters. Images that are within a certain threshold distance of the pseudo queries are added to the corresponding refined clusters.

At 310, the refined clusters are identified as being sets of duplicate images. Identification of the duplicate sets of images may be used to refine search results of search results, improve image recognition results, and so forth.

Figure 4:
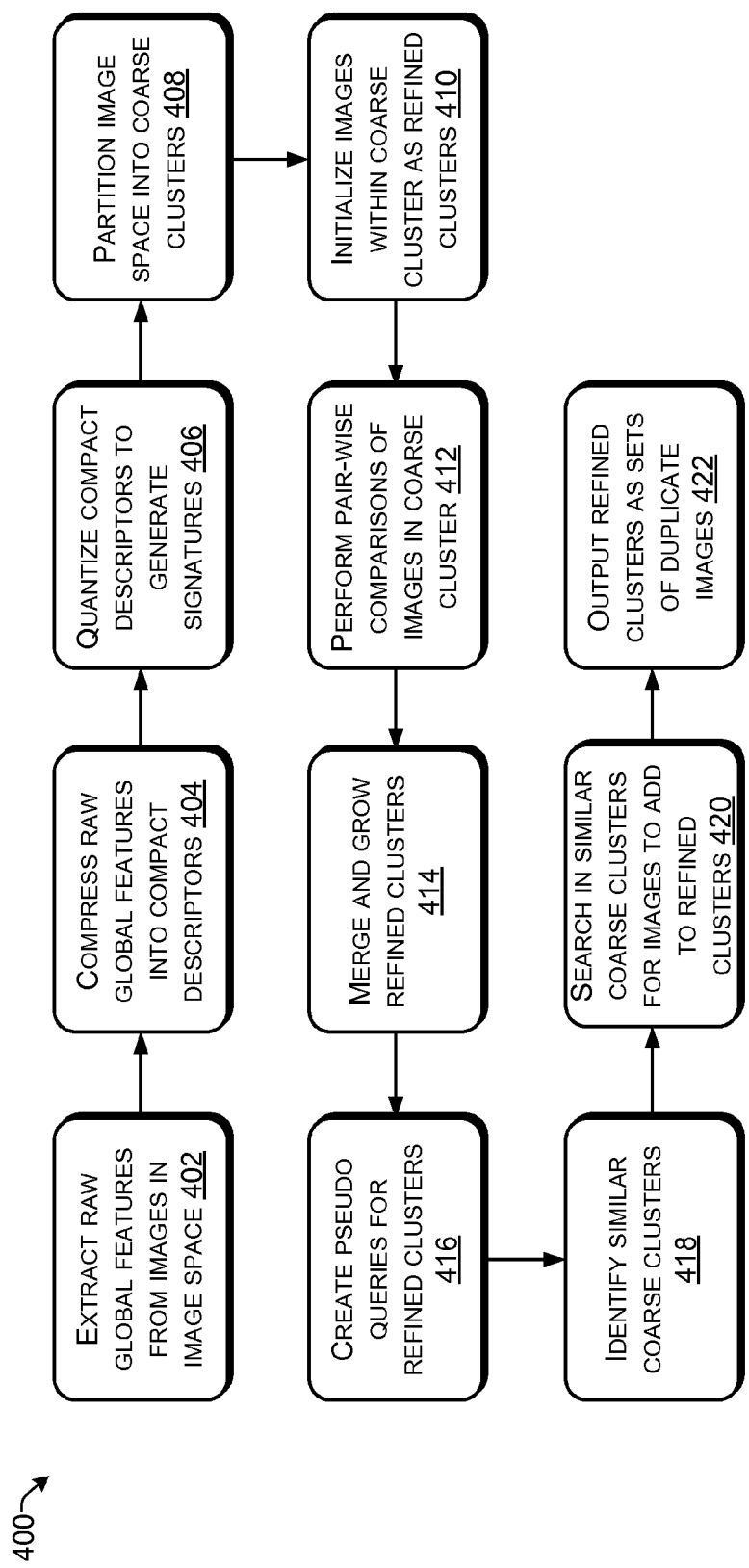
FIG. 4 is a flow diagram showing an example process for identifying duplicate images using an E-clustering algorithm.

FIG. 4 is a flow diagram showing an example process 400 for identifying duplicate images using an ϵ-clustering algorithm. At 402, a feature extraction module, such as the feature extraction module 214, extracts raw global features from a plurality of images of an image space. The raw global features includes, in embodiments, gray block features, edge directional histograms, and non-edge-pixel ratios. Other raw global features may be used without departing from the scope of embodiments.

AT 404, the feature extraction module compresses the raw global features into corresponding compact descriptors of the plurality of images. In embodiments, PCA is used to along with a PCA transfer matrix, which can be learned using a suitably sized sample of images.

At 406, the feature extraction module quantizes the compact descriptors using mean values of dimensions of the compact descriptors to generate signatures for the plurality of images.

At 408, a partition module, such as the partition module 216, partitions the image space into a plurality of coarse clusters such that groups of images with matching signatures are placed together into coarse clusters.

At 410, a cluster module, such as the cluster module 218, initializes the images within the coarse clusters as belonging to separate refined clusters. Thus, in an initial state, one or more images within a coarse cluster are initialized to be in separate refined clusters.

At 412, the cluster module performs pair-wise comparisons between images within the coarse cluster, according to the ϵ-clustering algorithm.

At 414, the cluster module adds images that are within a predetermined threshold distance of each other into the same refined cluster. If one or both of the images are in refined clusters with more than one image, the refined clusters are merged such that all images in both clusters are merged into one refined clusters.

At 416, a growth module, such as the growth module 220, creates pseudo queries for the refined clusters by averaging the compact descriptors of the images within the refined clusters. Because the compact descriptors of the images within a particular refined cluster will have little variance, the average compact descriptor is sufficiently representative of the refined cluster.

At 418, the growth module identifies coarse clusters that are similar to the refined clusters. Identifying the similar coarse clusters includes determining a Hamming distance between quantized binary signatures of average compact descriptors of the refined clusters and signatures associated with the coarse clusters. Those coarse clusters that are within a predetermined Hamming distance from the quantized binary signature of a particular refined cluster are identified as similar coarse clusters with respect to the particular refined cluster.

At 420, the growth module searches in the similar coarse clusters for images to add to the refined clusters. The searching includes determining whether the compact descriptors of the images in the similar coarse clusters are sufficiently similar to the pseudo query. This is repeated for each refined cluster for which similar coarse clusters are identified. Also, since one or more refined clusters are identified for each coarse cluster, the process of cluster growth (searching in similar clusters for images to add to a refined cluster) is performed on each refined cluster of each coarse cluster.

At 422, an output module, such as the output module 422, outputs the refined clusters as sets of duplicate images.

FIGS. 3 and 4 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

Computer-Readable Media

Depending on the configuration and type of computing device used, memory 204 of the computing system 200 in FIG. 2 may include volatile memory (such as random access memory (RAM)) and/or non-volatile memory (such as read-only memory (ROM), flash memory, etc.). Memory 204 may also include additional removable storage and/or non-removable storage including, but not limited to, flash memory, magnetic storage, optical storage, and/or tape storage that may provide non-volatile storage of computer-readable instructions, data structures, program modules, and other data for computing system 200.

Memory 204 is an example of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. A method comprising:
   partitioning a plurality of images of an image space into a plurality of coarse clusters, the partitioning based at least in part on signatures of the plurality of images determined from compact descriptors of the plurality of images;
   creating a refined cluster that includes one or more images of an individual coarse cluster based at least in part on pair-wise comparisons of the compact descriptors, from which the signatures are determined, of images of the individual coarse cluster;
   identifying the refined cluster as a set of duplicate images; and
   searching another coarse cluster of images for ones of the other coarse cluster to add to the refined cluster based at least in part on an average of the compact descriptors of the images of the refined cluster.

2. The method of claim 1, wherein the searching is at least partly in response to an identification of the other coarse cluster as being similar to the individual coarse cluster based at least in part on a Hamming distance between a quantized binary signature of the average compact descriptor and another signature associated with the other coarse cluster.

3. The method of claim 1, wherein the searching further comprises determining whether associated compact descriptors of the other coarse cluster have a similarity to the average of compact descriptors that is greater than a threshold similarity.

4. The method of claim 1, wherein the partitioning of the plurality of images into the plurality of coarse clusters includes placing images with identical signatures into the same coarse clusters.

5. The method of claim 1, further comprising quantizing the compact descriptors using mean values of dimensions of the compact descriptors to generate the signatures.

6. The method of claim 1, further comprising using Principal Component Analysis to compress raw global features of the plurality of images into the compact descriptors.

7. The method of claim 1, wherein the creating of the refined cluster includes identifying whether any images of the coarse cluster have associated compact descriptors within a threshold distance from an initial image of the refined cluster.

8. The method of claim 1, further comprising:
   extracting raw global features from a plurality of images of the image space, the raw global features including gray block features, edge directional histograms, and non-edge ratios; and
   compressing the raw global features to create the compact descriptors of the plurality of images.

9. A system, comprising:
   memory;
   one or more processors;
   a partition module stored on the memory and executable by the one or more processors to partition an image space into a plurality of coarse clusters based at least in part on signatures of images within the image space, the signatures determined from compact descriptors of the plurality of images;
   a cluster module stored on the memory and executable by the one or more processors to create refined clusters within the plurality of coarse clusters based at least in part on pair-wise comparisons of the compact descriptors, from which the signatures are determined, of images within individual ones of the coarse clusters;
   a growth module stored on the memory and executable by the one or more processors to search similar coarse clusters for images to add to the refined clusters based at least in part on an average of the compact descriptors of the images of the refined clusters; and
   an output module stored on the memory and executable by the one or more processors to output the refined clusters as sets of duplicate clusters.

10. The system of claim 9, wherein the growth module is further executable to identify the similar coarse clusters based at least in part on Hamming distances between the coarse clusters and the refined clusters.

11. The system of claim 9, wherein the growth module is further executable to search the similar clusters for the images to add to the refined clusters by determining whether associated compact descriptors of the images to add are within a threshold distance of the average compact descriptors of the refined clusters.

12. The system of claim 9, wherein the cluster module is further executable to:
   initialize the refined clusters to include first images; and
   add second images of the coarse clusters to the refined clusters based at least in part on second compact descriptors of the second images being within a certain distance threshold of first compact descriptors of the first images.

13. The system of claim 9, wherein the partition module creates the individual ones of the plurality of coarse clusters such that they include no images with non-duplicate signatures.

14. The system of claim 9, further comprising a feature extraction module stored on the memory and executable by the one or more processors to compress raw global features of the plurality of images into the compact descriptors using Principal Component Analysis.

15. The system of claim 14, wherein the feature extraction module is further executable to quantize the compact descriptors using mean values of dimensions of the compact descriptors to generate the signatures.

16. The system of claim 9, wherein the partition module is further executable to:
   extract raw global features from a plurality of images of an image space, the raw global features including gray block features, edge directional histograms, and non-edge ratios; and
   compress the raw global features to create the compact descriptors of the plurality of images.

17. One or more computer-readable storage media comprising a plurality of instructions executable by one or more processors of a computing system to cause the computing system to:

extract raw global features from a plurality of images of an image space, the raw global features including gray block features, edge directional histograms, and non-edge ratios;

compress the raw global features into corresponding compact descriptors of the plurality of images;

quantize the compact descriptors using mean values of dimensions of the compact descriptors to generate signatures for the plurality of images;

partition the image space into a plurality of coarse clusters such that groups of images with matching signatures are placed together into coarse clusters;

create one or more refined clusters within individual ones of the plurality of coarse clusters such that at least one of the one or more refined clusters include two or more images whose compact descriptors are within a threshold distance from one another;

grow the refined clusters by searching similar coarse clusters for images whose compact descriptors are within another threshold distance from averages of the compact descriptors of the refined clusters; and output the refined clusters as sets of duplicate images.

18. The one or more computer-readable storage media of claim 17, wherein the plurality of instructions is further executable to cause the computing system to:

initialize images within the individual ones of the plurality of coarse clusters as belonging to separate refined clusters; and merge together two or more of the separate refined clusters within the individual ones of the plurality of coarse clusters based at least in part on comparisons of corresponding compact descriptors of images of the separate refined clusters to determine whether the corresponding compact descriptors are within the threshold distance from one another.

19. The one or more computer-readable media of claim 17, wherein the plurality of instructions are further executable to cause the computing device to determine the similar coarse clusters based at least in part on Hamming distances between the plurality of coarse clusters.

20. The one or more computer-readable media of claim 17, wherein the plurality of instructions are further executable to utilize Principal Component Analysis to compress the raw global features into the corresponding compact descriptors.

* * * * *